(12) United States Patent
Pannell et al.

(10) Patent No.: US 7,283,290 B1
(45) Date of Patent: *Oct. 16, 2007

(54) ACOUSTO-OPTIC DEVICES HAVING HIGHLY APODIZED ACOUSTIC FIELDS AND METHODS OF FORMING THE SAME

(75) Inventors: Christopher N. Pannell, Orlando, FL (US); Elliot S. Wachman, Lakewood, NJ (US)

(73) Assignee: Gooch and Housego PLC, Somerset (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/391,829

(22) Filed: Mar. 29, 2006

(51) Int. Cl.
*G02F 1/11* (2006.01)

(52) U.S. Cl. .......... 359/285; 359/286; 359/287; 359/305; 359/311; 359/312; 359/313; 359/314

(58) Field of Classification Search ........ 359/285–287, 359/305, 311, 312–314
See application file for complete search history.

(56) References Cited

U.S. PATENT DOCUMENTS

| 4,250,474 | A | * | 2/1981 | Joseph | 359/311 |
| 5,463,493 | A | * | 10/1995 | Shah | 359/312 |
| 5,889,355 | A | | 3/1999 | Shah | |
| 6,236,492 | B1 | | 5/2001 | Kump | |

FOREIGN PATENT DOCUMENTS

| JP | 61081013 | 4/1986 |
| WO | WO 96/11753 | 4/1996 |

OTHER PUBLICATIONS

McGehee, D. et al. "Beamforming with dense random arrays: The development of a spatially shaded polyvinylidene fluoride acoustic transducer", 1994, J. Acoust. Soc. Am., 95(1):318-323.
Website at: globalsecurity.org/intell/library/imint/hyper.htm, "Hyperspectral Imaging", Feb. 19, 2006, 7 pages.
Goutzalis, A. P. "Acousto-Optic Material Selection", Design of Acousto-optic Deflectors, Publisher: CRC (Jan. 6, 1994), pp. 77-81.
Peitgen, Heinz-Otto et al., "Growing Classic Fractals with L-Systems", Chaos and Fractals, 1992, 2004, ISBN 0-387-20229-3, pp. 355-366.
Velho, L. et al. "Digital halftoning with space filling curves", Computer Graphics, vol. 25, No. 4, Jul. 1991, pp. 81-90.

* cited by examiner

*Primary Examiner*—Evelyn A. Lester
(74) *Attorney, Agent, or Firm*—Akerman Senterfitt; Neil R. Jetter

(57) ABSTRACT

An acousto-optic (AO) device for generating a highly apodized acoustic wave field includes a piezoelectric transducer crystal for emitting an acoustic wave having a ground electrode disposed on one side of the piezoelectric crystal, and a patterned electrode layer disposed on a side of the piezoelectric crystal opposite the ground electrode. The patterned electrode layer includes a continuous region proximate to its center and a discontinuous region, a pattern in the discontinuous region including a plurality of spaced apart features electrically connected to the continuous region. An AO interaction crystal which receives the acoustic wave is attached to the ground electrode or the patterned electrode layer. A feature size of the features in the pattern are sufficiently small to provide a fine structure far field condition for the acoustic wave in the AO interaction crystal underlying the discontinuous region beginning <5 mm measured from an interface between the piezoelectric crystal and the AO interaction crystal.

21 Claims, 12 Drawing Sheets

ACOUSTO-OPTIC DEVICES HAVING HIGHLY APODIZED ACOUSTIC FIELDS AND METHODS OF FORMING THE SAME

FIELD OF THE INVENTION

The present invention relates to acousto-optical devices, and more particularly to acousto-optic devices having highly apodized acoustic fields.

STATEMENT REGARDING FEDERALLY SPONSORED RESEARCH OR DEVELOPMENT

Not applicable.

BACKGROUND OF THE INVENTION

Devices in which an acoustic beam and an optical beam interact are generally referred to as "acousto-optic devices" or AO devices. Examples of common AO-based devices include acousto-optic tuneable filters (AOTFs), acousto-optic modulators, (also called "Bragg cells"), and acousto-optic deflectors. In most commercial AO devices, the acoustic beam is introduced into an acousto-optic (AO) interaction medium, such as $TeO_2$, using an acoustic transducer in the form of a plate of a crystalline piezoelectric material, such as lithium niobate (LN). A top electrode is used to excite acoustic vibrations in the transducer. A metal ground electrode is used before bonding, and the metal top electrode is deposited on the upper surface, forming a structure analogous to a parallel plate capacitor. An RF generator is connected between the ground electrode and the top electrode via a suitable broadband electrical matching network to limit reflection of RF energy, and serves to produce mechanical vibrations in the plate due to the piezoelectric effect. These vibration waves pass into the AO interaction medium, where they produce diffraction of the incident optical fields, after which they are generally absorbed by a suitable absorber of acoustic waves to prevent acoustic reflections inside the interaction medium, which can degrade the performance of the device.

An AOTF is frequently used when it is desired to rapidly select one or more optical wavelengths from an incident optical beam containing a range of optical wavelengths. FIG. 1 shows the k-space diagram and accompanying real-space diagram for a typical non-collinear AOTF 100. The AOTF shown includes a piezoelectric acoustic transducer t 105 bonded to a crystal of suitable birefringent AO interaction crystalline material 110 (PQWS in FIG. 1). The electrodes disposed on both sides of the transducer (t) 105 are not shown for simplicity. The phase velocity of the acoustic wave emerging from t is at an angle $\theta_a$ to the optical axis of the AO interaction crystal 110. Light enters the device 100 through the input face RS of the AO interaction crystal 110 having incident polar angle $\theta_i$ and wave vector $k_i$. Provided the RF frequency applied is adjusted to satisfy the resonant condition, the light is strongly diffracted to emerge through the output face PQ of the AO interaction crystal 110 with the diffracted wave vector $k_d$, at a polar angle $\theta_d$. The angular distance between the incident light and the first order diffracted light is therefore $\theta_d$-$\theta_i$ allowing separation of the respective light beams.

If white or other broadband light is incident on the AOTF, then once the RF frequency (and hence the acoustic wavelength and acoustic k-vector $K_A$) is chosen, only a narrow band of optical wavelengths close to the resonant wavelength will be diffracted. Such a device may for example be used in a spectroscopic instrument or hyperspectral imaging system, where the input beam of unfiltered light corresponds to some part of the optical train, e.g. the "infinity space" of an optical microscope in which the angular divergence of the light collected from the object is purposely kept small. This infinity space is designed for the insertion of optical filters, polarizers and other components by the manufacturer. Although an optical microscope is used herein for the purposes of illustration, these comments apply equally well to any other optical imaging system. An AOTF has significant advantages for such an application because of its ability to tune very quickly between wavelengths. Typical non-collinear AOTFs made using TeO2 use acoustic wavelengths in the range of 5 to 20 µm in the interaction medium. By applying more than one RF frequency simultaneously, multiple optical pass bands may be created, this being an advantage besides speed provided by an AOTF over competing technologies.

Since AOTFs were developed many years before interest in precision applications including imaging reached its present high levels, conventional AOTFs do not provide the performance required for more demanding applications. In precision applications it is important for the AOTF to allow through only light wavelengths that are in a narrow band centered on the selected wavelength and strongly reject all other wavelengths.

A standard AOTF uses continuous electrodes on both sides of the transducer. Such a device generates a uniform acoustic field throughout the interaction length in the AO interaction crystal. This arrangement that is not conducive to either high quality image formation or good filter response. A uniform acoustic field produces an optical pass-band that has poor rejection of adjacent wavelengths owing to the presence of significant sidelobes in the transmission function of the filter. It is the height of these sidelobes relative to the height of the main filter peak, which to a large extent determines the overall performance of the AOTF.

FIG. 2 shows an AOTF 200 including a rectangular transducer electrode 210 and associated AO interaction crystal 215, along with the resulting acoustic field shown below in the AO interaction crystal 215. The area of electrode 210 defines the functional area of the generally larger area associated transducer (transducer not shown in FIG. 2). It is generally known to improve AOTF operation the acoustic intensity in the interaction region of the AO interaction crystal should start off at a low level at the input end of the interaction region, then build up smoothly to a maximum in the centre of the interaction region (x=L/2 in FIG. 2). After the centre the acoustic intensity should fall off so that it is again low at the output end of the interaction region. The exact form of the mathematical function, which defines the rise and fall of the acoustic amplitude, S(x) in FIG. 2, is not unique. Many "windowing functions" have been used in the context of Fourier transforming of data, for example, the Parzen window, the cosine window, the truncated Gaussian, and most are generally suitable.

The local strength of the acoustic wave generated by a piezoelectric transducer depends on the product of (1) the local electric field strength and (2) the local piezoelectric activity, the latter being related to the crystal structure of the transducer. Usually the transducer used in acousto-optic devices is a single crystal of lithium niobate (LN). A piezoelectric material such as LN is a so-called "hard ferroelectric" and it is difficult to manipulate the local piezoelectric strength in the way one may for example manipulate the local piezoelectricity of a piezoelectric ceramic. This latter material being typically used in acoustic transducers for generation of lower frequency (tens to hundreds of KHz) acoustic waves for example in sonar applications. Thus, it is relatively easy to arrange for a sonar transducer launching an acoustic beam into water to be apodized by controlling the degree of local poling of the piezoelectric material, and so generate an acoustic beam of arbitrary spatial intensity distribution, but it is comparatively difficult to apodize the beam from a LN transducer launching an acoustic beam into an AO crystal. A designer generally has only two options in practice; to attempt alter the piezoelectric activity or to locally alter the electric field strength.

Local alteration of the electric field inside the LN crystal comprising the acoustic transducer can be achieved by patterning the top electrode. Instead of a continuous top electrode of substantially rectangular form which is conventionally used, a pattern can be chosen which achieves a gradual reduction of the average electric field in the piezoelectric transducer with movement out towards the input and output faces of the acousto-optic interaction crystal, and thus generates some apodization of the acoustic wave. This has been achieved by dividing up the rectangular top electrode into a small number (e.g. up to 11) of electrically independent sub-electrodes and driving at least some of the electrodes using a multiplicity of independent RF drivers. In this arrangement, each electrode segment requires its own matching circuit and flexible cable connection to the multichannel "driver", the latter containing all the RF drive electronics including the RF amplifiers. All the cables must be closely matched in length to within a few mm and the adjustment procedure needed to get all the transducer sub-elements operating substantially in phase over the whole tuning range is difficult, requiring a high level of skill. If the transducer elements do not operate in phase due to incorrect adjustment or manufacture, the device will not work properly. The RF power fed to the transducer sub-elements is chosen to approximate to the desired apodization function, for example a Gaussian, the "tails" being at the input and output ends of the interaction region, and the maximum being in the centre. This method works well when it is adjusted properly, and side-lobe reductions of 20 dB can be achieved, however it is complicated and expensive, requiring a complicated and expensive bank of RF drivers rather than a single RF driver.

Another method that has been used to apodize an acoustic transducer for an AOTF is also known. FIG. 3(a) shows a top electrode 305 in the form of a "diamond" shape, which has been used to achieve apodization of the acoustic wave field while FIG. 3(b) shows the implementation of the diamond shaped transducer for an AOTF 300 wherein light is incident on the acousto-optic interaction medium 310 through the surface ABCD on its input face and exits through HEF on its output face. The opposite points of the "diamond" are adjacent to the input and output extremes of the interaction region and the widest part (SP in FIG. 3(b)) of the diamond corresponding to the centre of this region. As before, the top electrode area defines the functional area of the generally larger area associated transducer (transducer not shown in FIGS. 3(a) and (b)). The acoustic field in the AO interaction region starts off at a small value (radiating from the point of the diamond nearest the input face) and builds up gradually to a maximum where the metal pattern is widest (SP), then reduces again. This electrode design has been found by the Inventors to reduce sidelobe levels by 6 dB or less in practice, thus not being generally useful because reductions of 10-20 dB are generally required for modern precision AOTF applications, such as for imaging.

What is needed is a new AO design that is relative simple to fabricate and operate for strongly shaping or "apodizing" the acoustic beam to optimise filter quality and image quality by substantially reducing the level of the undesired sidelobes transmitted with the desired optical beam.

SUMMARY

An acousto-optic (AO) device for generating a highly apodized acoustic wave field includes a piezoelectric transducer crystal for emitting an acoustic wave having a ground electrode disposed on one side of the piezoelectric crystal, and a patterned electrode layer disposed on a side of the piezoelectric crystal opposite the ground electrode. The patterned electrode layer includes a continuous region proximate to its centre and a discontinuous region, a pattern in the discontinuous region including a plurality of spaced apart features electrically connected to the continuous region. An AO interaction crystal which receives the acoustic wave is attached to the ground electrode or the patterned electrode layer. A feature size of the features in the pattern are sufficiently small to provide a fine structure far field condition (described below) for the acoustic wave in the AO interaction crystal underlying the discontinuous region beginning <5 mm measured from an interface between the piezoelectric crystal and the AO interaction crystal.

In one embodiment the feature sizes in the pattern are predominately (>50%) less than 20 μm. In another embodiment the feature sizes in the pattern are predominately less than 10 μm. The pattern preferably provides a reduction in the amount of metal when moving outward from the continuous centre outward in both directions. In one embodiment the reduction in metal moving outward from the center is a monotonic reduction.

The patterned electrode layer can be based on a fractal pattern. In this embodiment the fractal pattern can be based on the application of a space filling 2 dimensional fractal curve.

The pattern can comprise Gaussian weighting having the features oriented parallel to one another and orthogonal to a length of the central region. In one embodiment of the invention the pattern comprises a spaced apart electrode grid disposed parallel to a length of the continuous region, where the grid is electrically coupled together using at least one bus bar.

In one embodiment of the invention, the fine structure far field condition begins <2.5 mm from said interface, and preferably begins <1.0 mm from the interface.

In one embodiment of the invention the transducer crystal includes a plurality of sub-surface locations having altered sites, said altered sites being fine patterned and reducing a piezoelectric effect therein.

The AO device can comprise an Acousto-Optic Modulator (AOM), Acousto-Optic Beam Deflector (AOBD), Bragg Cell (BC), Acousto-Optic Tunable Filter (AOTF), Acousto-Optic Frequency Shifter (AOFS) or an Acousto-Optic Correlator (AOC). In one embodiment, the invention comprises a hyperspectral imaging spectrometer system. The imaging system comprises an AO device described above having a patterned electrode layer including a continuous region proximate to its centre and a discontinuous region, a pattern in the discontinuous region including a plurality of spaced apart features electrically connected to the continuous region. An AO interaction crystal for receiving the acoustic wave is attached to the ground electrode or the patterned electrode layer. A feature size of the features in the pattern are sufficiently small to provide a fine structure far field condition for the acoustic wave in the AO interaction crystal underlying the discontinuous region beginning <5 mm measured from an interface between the piezoelectric crystal and the AO interaction crystal. The AO device separates an image of a scene into a separated image comprising its spectral elements. The system includes camera optics and a focal plane array (FPA), the camera optics for imaging the separated image onto the FPA.

A method of forming an acousto-optic (AO) device for generating a highly apodized acoustic wave field comprises the steps of providing a piezoelectric transducer crystal, laser irradiating a plurality of locations in the transducer crystal to induce mechanical sub-surface altered sites leading to a reduction or loss of the piezoelectric effect in the altered sites, and bonding the piezoelectric transducer crystal to an AO interaction crystal. The altered sites can result in either a suppression of the local piezoelectric activity of the transducer crystal or an inversion of local crystal axes of said transducer crystal leading to a sign reversal of its piezoelectric tensor components. A geometry and number density of the altered sites provides a fine structure far field condition for an acoustic wave in the AO interaction crystal underlying the altered sites beginning <5 mm measured from an interface between the piezoelectric crystal and the AO interaction crystal. The laser irradiating can comprises pulsed laser irradiating. In one embodiment, the altered sites provide feature sizes predominately less than 20 µm, preferably less than 10 µm. The density of altered sites preferably provides a reduction when moving outward from a centre of the transducer crystal in both directions. The altered sites can be in fractal patterns.

BRIEF DESCRIPTION OF THE DRAWINGS

A fuller understanding of the present invention and the features and benefits thereof will be obtained upon review of the following detailed description together with the accompanying drawings, in which:

FIG. 3(a) shows a top electrode in the form of a "diamond" shape, which has been used to achieve apodization of the acoustic wave field while

DETAILED DESCRIPTION

Figure 4:
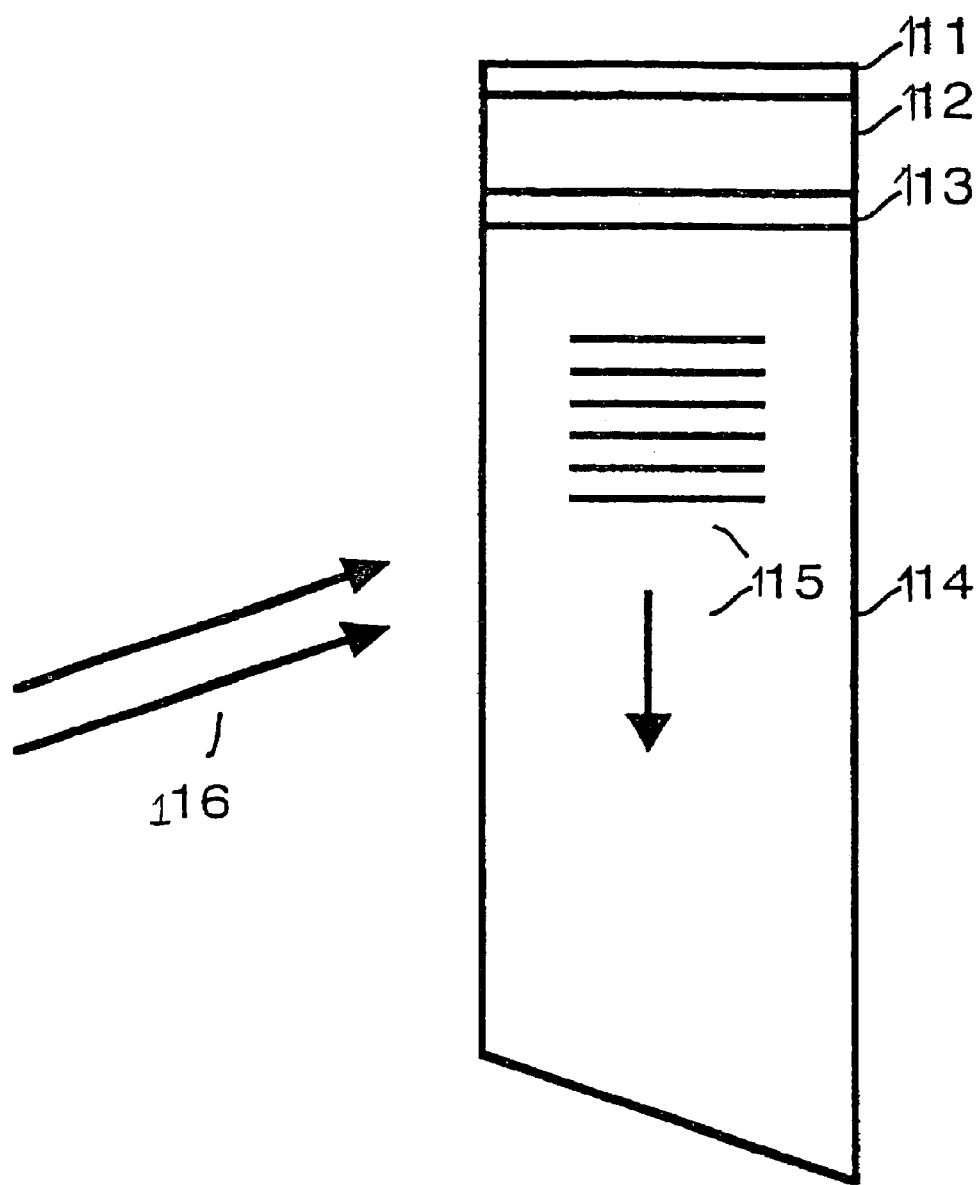
FIG. 4 shows a side view of an acousto-optic AO device for generating a highly apodized acoustic wave according to an embodiment of the invention.

FIG. 4 shows a side view of an acousto-optic (AO) device for generating a highly apodized acoustic wave according to the invention having an AO interaction crystal 114, piezoelectric material 112, top electrode(s) 111 and bottom electrode(s) 113. The AO interaction crystal 114 is a birefringent material in certain applications, such as when the device is an AOTF. One of the electrodes is a patterned layer having "fine structure" and the electrodes 111 and 113 are separated by the thickness of the piezo-electric material 112. The patterned electrode layer includes a continuous region proximate to its centre (midpoint of the interaction length) and a discontinuous region on both sides of the centre, as will be described in detail below together with exemplary patterns shown in several figures. The pattern in the discontinuous region comprises a plurality of spaced apart features electrically connected to the continuous region.

Sound waves, represented by lines and arrow 115, are generated by piezo-electric material 112 in response to RF signals applied across top electrode 111 and bottom electrode 113. Arrows 116 represent incident optical beams being transmitted toward AO crystal 114. The index of refraction throughout AO 114 varies based on the sound waves generated by piezo-electric material and propagated through AO crystal 114. The sound waves control what portion of the incident optical beams are diffracted as the optical beams travel through acousto-optic crystal 114. The shape of the electrodes in the patterned electrode layer influences the shape of sound waves propagating through AO 114 and is the focus of the principal embodiment of the invention.

The feature size(s) of the features in the electrode pattern referred to herein as being a "fine structure" is sufficiently small to provide a fine structure far field condition (as defined below) for the acoustic wave in the AO interaction crystal underlying the discontinuous region beginning <5 mm measured from an interface between the piezoelectric crystal and the AO interaction crystal for a 10 micron wavelength acoustic wave. When fine structure far field condition distances are specified herein, the acoustic wavelength is at 10 microns, unless otherwise noted. Acoustic waves in the range from 5 to 20 microns represents a typical design tuning range for a non-collinear AOTF operating in the visible or near-IR portions parts of the electromagnetic spectrum). Constraining the desired far field associated with the fine structure to begin no further than 5 mm away from the piezoelectric/AO interaction crystal interface, equation 1 (described below) with Zo=5 mm gives L=158 microns for an acoustic wavelength, $\Lambda$=5 microns, and L=224 microns for an acoustic wavelength of 10 microns. If the maximum allowable characteristic feature size in the top electrode pattern is taken to be the minimum of 158 and 224, i.e. 158, the desired condition on the far field will be satisfied throughout the full tuning range of the device.

In devices actually fabricated, electrode patterns have been on the order of 10× finer than this maximum feature size, because mask patterns were generated on a (10 micron by 10 micron) grid, resulting in characteristic features sizes of the order of 10 microns in the patterns generated. Thus, according to equation 1, the fine structure far field is calculated to begin only 10 microns (0.01 mm) away from the interface in the case of 10 micron acoustic waves, and only 20 microns (0.02 mm) away in the case of 5 micron acoustic waves, thus, for generally all practical purposes, at the interface itself.

The numerical factor $\xi$ which appears in equation 1 is related to the curvature of the acoustic dispersion surface and a modification introduced to take account of the fact that the material is acoustically anisotropic. For TeO$_2$, and in similar materials for non-collinear AOTFs, $\xi$ is less than unity, for example, 0.2, which for a given characteristic feature size L, and a given wavelength, $\Lambda$ in equation 1, results in a reduction of the Rayleigh range Zo, compared to an isotropic material in which $\Lambda$ is unchanged. This actually benefits the inventive devices since it results in the fine structure far field region starting even closer to the interface than would be the case in an isotropic medium and so represents an added "safety factor" in the design.

The invention thus manipulates the electric field in the transducer using fine-structuring of an electrode layer associated with the transducer, in order to achieve high levels of apodization of the radiated acoustic field into the attached AO interaction crystal. Another related technique for achieving the desired fine structure far field condition for the acoustic wave in the AO interaction crystal involves locally altering the transducer crystal as described below. Both techniques may be combined. The high level of apodization obtained using either technique results in a far field condition for the acoustic wave in the AO interaction crystal to begin within 5 mm of the transducer/AO crystal interface. Thus, the invention keeps almost the entire volume of the AO crystal in the far field of the top electrode fine structure. Electrode designs according to the invention have demonstrated side lobe levels for optical beams outputted by the devices according to the invention reduced by 10-20 dB, or more, as compared to conventional rectangular electrode designs.

It is well known in diffraction theory that the sound wave field produced by a radiating acoustic transducer may be broadly divided into two distinct regions, (1) the near field and (2) the far field. The near field is characterised by relatively complex and inhomogeneous spatial phase and amplitude distributions, resulting in the phases and amplitudes which vary strongly with position. The far field is the region where the disturbance has traveled sufficient distance for the inhomogeneous phase distributions to have settled down into a much more orderly form. It is the onset of the region where the asymptotic properties of the wave field begin to show themselves, with the wave field beginning to display increased smoothness, and taking on characteristics of the familiar inverse square property.

The distinction between these two regions, the near and far field, is made herein and quantified with the aid of the so-called Rayleigh range $Z_0$, defined as:

$$Z_0 = \frac{\xi L^2}{\Lambda} \quad (1)$$

In equation (1) $Z_0$ is the Rayleigh range, often called the confocal parameter, L is a characteristic length associated with the transducer, $\xi$ is a numerical factor of the order unity, and $\Lambda$ is the acoustic wavelength. If the distance of interest $Z>Z_0$, far field conditions exist, otherwise near field conditions exist. The factor $\xi$ may be calculated once the exact geometry of the particular case is known. (e.g. see A. P. Goutzalis, "Design and Fabrication of Acousto-optic Devices", Publisher: CRC (Jan. 6, 1994) ISBN: 082478930X).

In a conventional non-apodized (uniform) AOTF transducer in which a rectangular top-electrode is used of dimension typically 10 mm square, at an acoustic wavelength of 10 $\mu$m (a typical figure), the value of the Rayleigh range $Z_0$ would be $Z_0$=10 m taking $\xi$=1 and L=10 mm (using equation 1). In the case of sonar or similar applications, a typical device having a transducer diameter of 50 mm operating at a frequency of 40 kHz (corresponding to an acoustic wavelength in water of 37 mm assuming an acoustic velocity of 1.48 km/sec in water) has a corresponding Rayleigh range $Z_0$ of approximately 68 mm. Since it is unlikely to use sonar to detect objects closer than 68 mm, such a device is always operating in the far field. However, in acousto-optics, the device unlike the sonar device includes an AO interaction crystal bonded to the transducer. The AO interaction crystal has characteristic sizes of a few cm generally being the upper limit due to the current state of the art of crystal growth. Accordingly, acousto-optic devices such as AOTFs are almost always operating in the near field of the transducer taken as a whole.

Figure 3A:
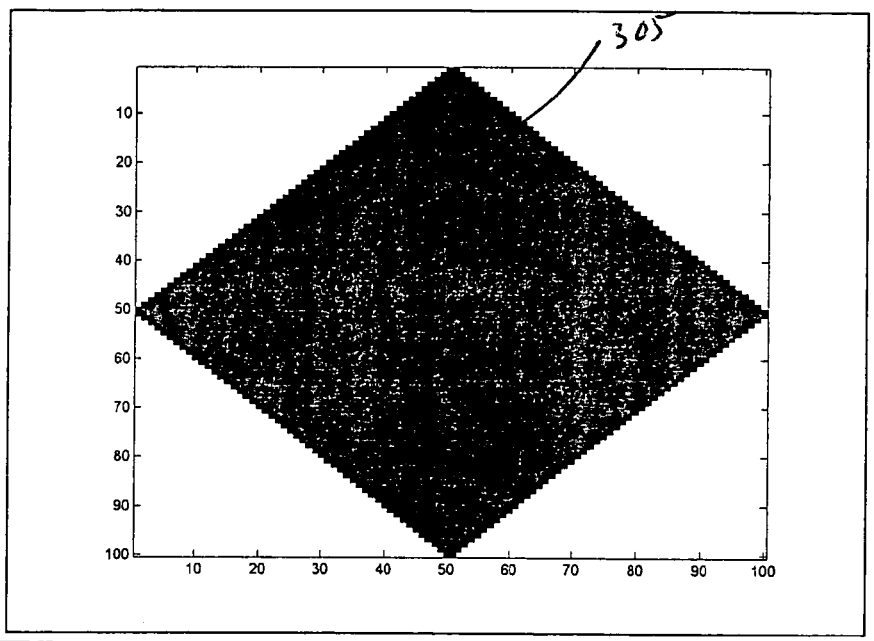
Figure 3B:
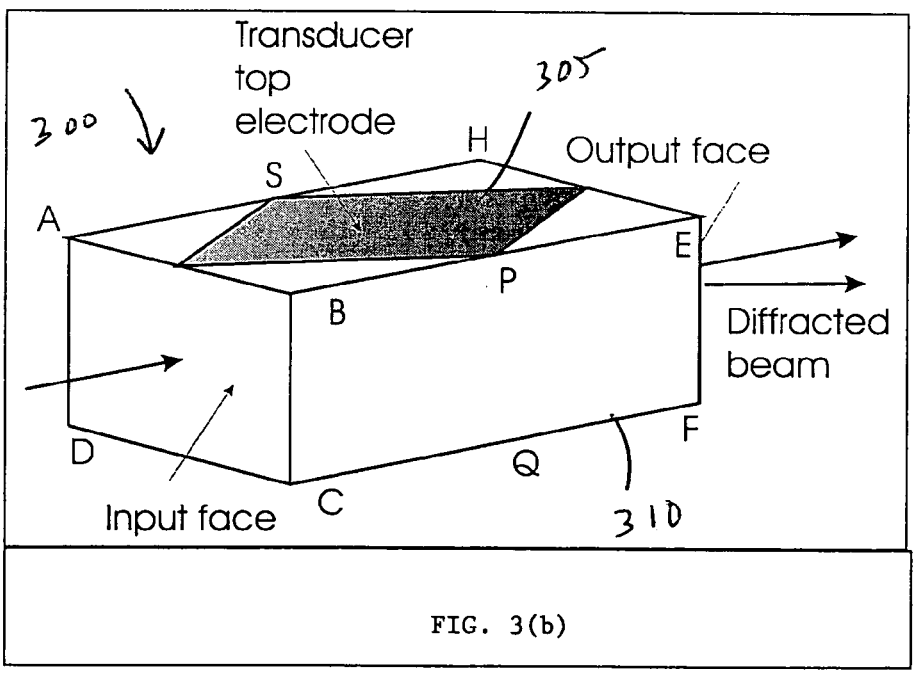
FIG. 3(b) shows the implementation of the transducer wherein light is incident on the acousto-optic interaction medium through the surface ABCD on its input face and exits through HEF on its output face.

The Inventors have found that if a metal electrode on the acoustic transducer is finely patterned to weaken the acoustic field radiated from some regions of the transducer, then the inhomogeneity in the radiated acoustic field caused by the patterning essentially vanishes at very small distances in the AO interaction crystal measured from the transducer interface. Referring now to FIGS. 3(a) and 3(b), because in a typical AOTF it is desirable for the useable optical aperture (i.e. the area of face ABCD in FIG. 3(b)) to be as large as possible for a given crystal size, it is desired to typically want the useable optical aperture to extend from the far side DCQF to within a few mm from the crystal face on which the transducer is bonded (face ABEH in FIG. 3(b)).

To provide the desired apodization by patterning the metal top electrode, the characteristic length scale associated with that patterning (referred to below as $L_{apo}$) is preferably small enough for the far field of the apodization fine structure given by:

$$Z_{apo} = \frac{\varsigma L_{apo}^2}{\Lambda} \quad (2)$$

to begin within a few mms from the transducer interface with the AO interaction crystal. It has be found by the Inventors that failure to fulfil this condition, for example by using an apodization scheme that is too coarse, results in the field inhomogeneity caused by the apodization scheme to propagate for large distances and still be evident in the region of the AO interaction crystal in which the acousto-optic interaction occurs. As a result, large amplitude and phase fluctuations in the radiated field introduced by the apodization scheme will not have been filtered or "smoothed" sufficiently and the apodization scheme will not work properly. This is the case with the related art AOTF device 300 shown in FIG. 3(b), in which substituting a diamond shaped top electrode instead of the rectangular electrode covering face ABEH represents an attempt at apodization, which is illustrative of a technique which can be considered to be macroscopic patterning, to distinguish it from the distinct fine patterning of the present invention. It would be reasonable to define the characteristic length scale associated with this (macroscopic) apodization scheme to be $L_{apo}$=L/2 where L was the original length of side BE. Macroscopic patterning is defined here as any top electrode patterning which deviates from a uniformly metalled ("non-patterned") top electrode by the introduction of structure with a characteristic length scale which is the same order of magnitude as the original dimensions of the uniformly metalled region (usually rectangular). The device 300 of FIG. 3(b) having a diamond shaped top electrode is one example of this macroscopic patterning. The far field of the macroscopic apodization structure begins at one quarter of the Rayleigh range of the transducer as a whole in this case, i.e.

$$Z_{apo} = \frac{Z_0}{4} \quad (3)$$

In the previous calculated example described above, the Rayleigh range $Z_0$ of the transducer was 10 m, the Rayleigh range associated with the macroscopic structure is 2.5 m, still far too long for an acousto-optic device, for example, using an AO crystal of characteristic dimensions of the order of 3 cm. Using equation (1), if the Rayleigh range (Zo) of the apodization fine structure, $Z_{apo}$, is desired to be 5 mm, for example, then the maximum "characteristic length" of any top electrode feature appearing will be approximately 158 μm assuming an acoustic wavelength of 5 μm. Feature sizes can be defined by the smallest feature dimension, elected from features size (e.g. finger width) or feature spacing or feature repeat distances, in the case of periodic, or partly periodic patterns. Keeping to this selected fine electrode structure condition ensures that the region of acousto-optic interaction provided begins no closer than 5 mm from the transducer. As a result, operation of the AO device in this range will be safely in the far field of the transducer top electrode's fine structure.

Accordingly "fine patterning" according to the invention can be defined as the maximum allowable feature size in the discontinuous region of the pattern which provides a fine structure far field ($Z_{apo}$) beginning <5 mm of the interface between the transducer and AO crystal, preferably <2.5 mm, and most preferably <1 mm, such as <0.5 mm, according to equation 2.

Alternatively, the "fine structure" can be defined as being on the same order of magnitude as the typical acoustic wavelengths in the device. For typically acoustic wavelengths in the 5-10 μm range, fine structure would thus mean feature sizes under 100 μm. More broadly, fine structure would be provided by dimensions within two orders of magnitude of the acoustic wavelength being processed, or <1000 μm (1 mm) for a 10 μm acoustic wavelength.

This principle is fundamental to the invention is a fine electrode structure for achieving apodization in acousto-optic devices. However, there is another principle believed to be operating which may also be considered, which has its origin in the need for the acoustic transducer to operate over a broad band of RF frequencies, typically an octave or more. In order to ensure a uniform ("flat") response of the filter over its design tuning range, it is important that the acoustic transducer does not radiate any sub-interval of acoustic wavelengths within the tuning range significantly more efficiently than any other. It is also important that the form of the apodization function is essentially independent of the acoustic wavelength in the range of interest (e.g. 5 μm to 10 μm), otherwise, in the case of the AOTF, the filter band shape and sidelobe levels will vary substantially as the device is tuned over a band. There are two ways to simultaneously achieve both conditions. (1) One way is to make the characteristic length scales of the apodization fine structure comparable with, or smaller than, the smallest acoustic wavelength to be used, or (2) to arrange to have a distribution of characteristic length scales which is substantially uniform over the design tuning range (aperiodic condition). In other words, if the design tuning range of acoustic wavelengths is 5 μm to 10 μm, then fundamental feature sizes of substantially less than 5 μm should ideally be used in order to satisfy (1), or the pattern can be of a type that there was a uniform distribution of characteristic features sizes extending at least from 5 μm to 10 μm. Such a condition could be achieved by using an approximation to a fractal electrode metallization pattern, because a characteristic of a fractal pattern is that features are repeated or nearly repeated on a wide distribution of size scales. A definition of fractals, consistent with common usage, can be found in "Chaos and Fractals" by Heinz-Otto Peitgen, Hartmut Jürgens, Dietmar Saupe, Springer_verlag, 1992, 2004, ISBN 0-387-20229-3 (hereafter "Peitgen").

In another embodiment of the invention, the local piezoelectric activity is manipulated to achieve apodization of the radiated acoustic field. In an acoustic transducer which is bonded to some substrate, the strength of the acoustic wave generated in the substrate depends on the local electric field and the local piezoelectricity, more precisely, the product of the two. Varying either the local electric field as describing above is one way of doing this, and varying the local piezoelectric activity is another. As noted above, both variations can be used together to likely provide higher levels of apodization as compared to one variation.

One way to alter the local piezoelectric activity is by focusing laser (or other suitable radiation) radiation into the interior of the material so as cause local damage or depolarisation of the crystal, thus lowering or eliminating the piezoelectric activity in that region. Focus generally results in the damage occurring in the bulk (rather than the surface) of the crystal. If this process of inducing damage sites is conducted on a fine enough scale, using the same rules for definition of fine structure as described above, then the required apodization will be produced. In this case, the "fine patterning" refers to the variations in local density of the damage sites in the transducer crystal. Regions of high density of damage generate low acoustic intensity, while regions which are undamaged by the radiation processing generate high acoustic intensity. The variations from place to place inside the transducer crystal conform to the rules of "fine patterning" as described above regarding electrode fine structure patterning. Preferably, the variations in area density of damage sites exceeds characteristic size of 100 µm so that the far field of the acoustic wave resulting from this fine patterning begins at <5 mm from the transducer interface with the AO crystal as in the case of top electrode fine patterning.

Figure 5:
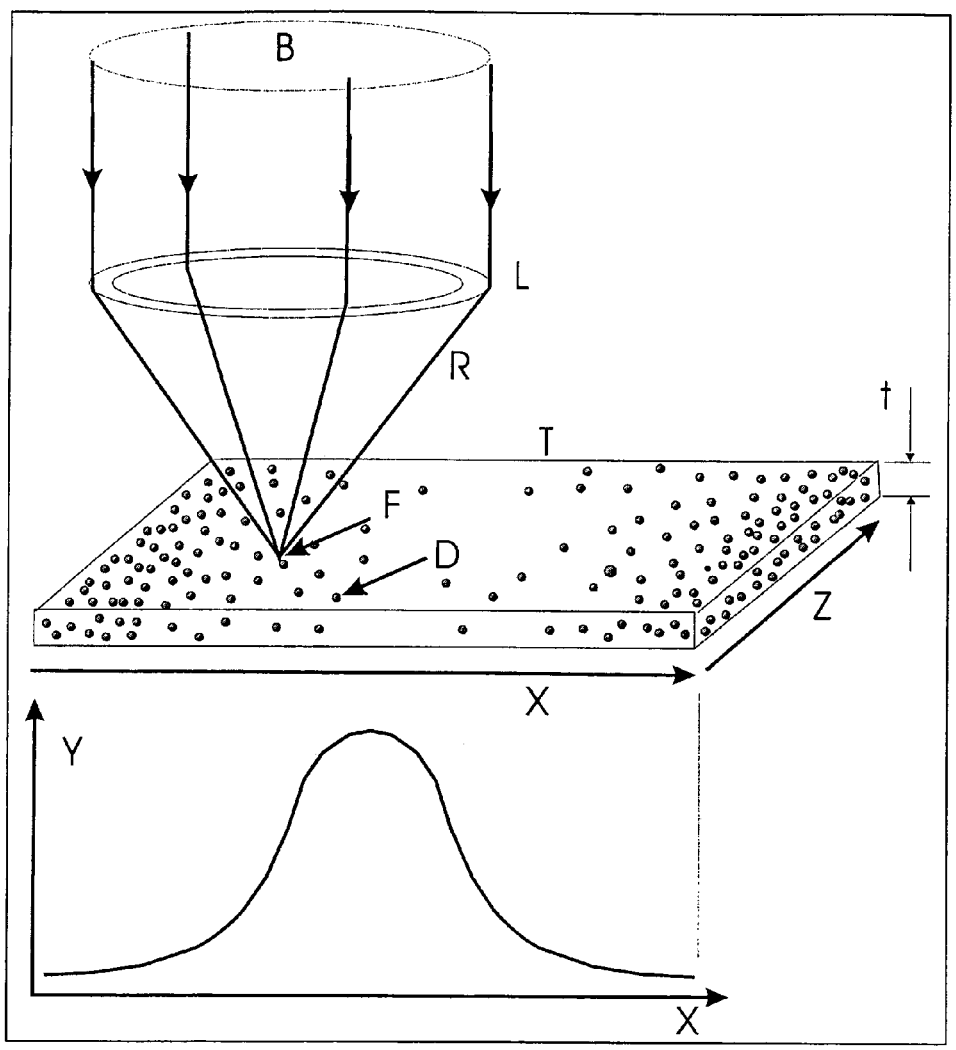
FIG. 5 shows an alternative apodization scheme in which laser radiation is used to alter the local piezoelectric activity of an initially homogeneous transducer crystal.

In this apodization scheme, as shown in FIG. 4, the electric field is uniform but the local piezoelectric activity of the piezoelectric (e.g. lithium niobate (LN)) is modified during manufacture using laser radiation. Preferably using optical pulses of short duration (typically from 50 fs to several ns) the initially homogeneous plate of LN is treated so as to change the local piezoelectric activity in chosen regions. FIG. 5 shows the density of modified sites being essentially random but the area density increasing on average towards the edges in a pre-arranged fashion to produce the desired apodization.

Figure 2:
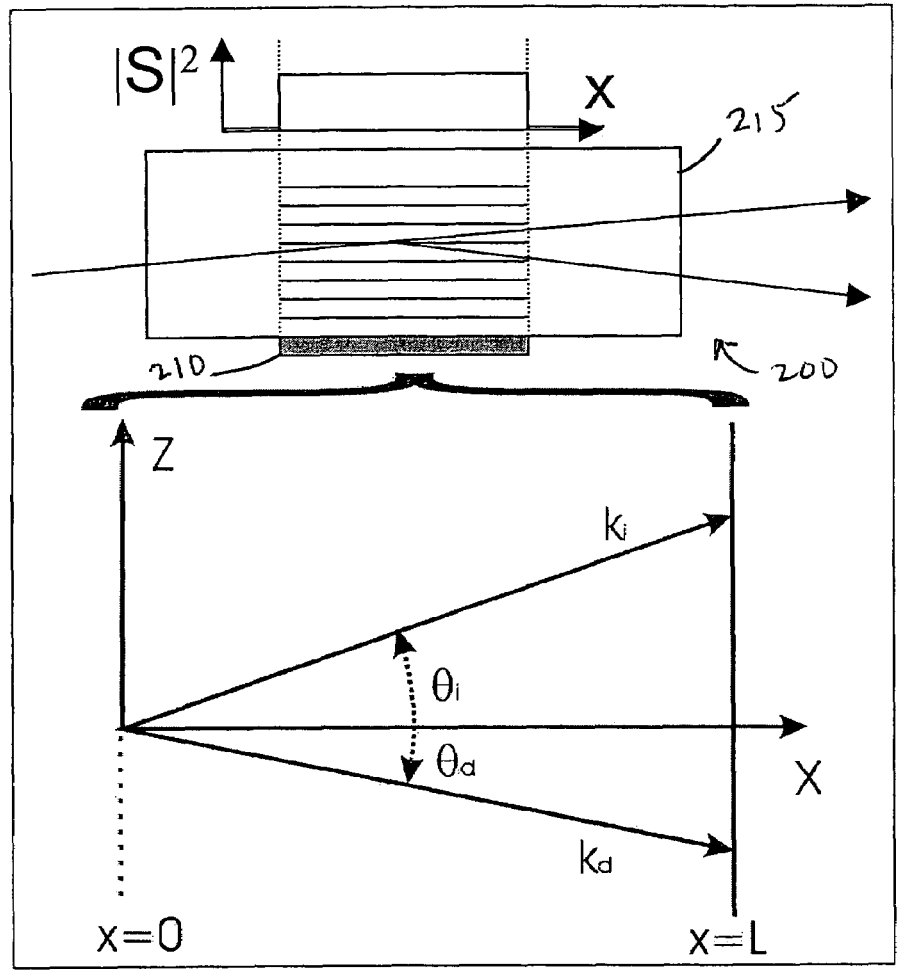
FIG. 2 shows schematically the effect on the sound intensity distribution in the AO interaction crystal of having a uniform acoustic transducer top electrode.

The laser radiation, in the form of a beam B, can be focused onto the LN or other suitable transducer crystal T of thickness t, using a lens L of high numerical aperture. The laser radiation is typically be in the form of short pulses derived (e.g.) from a Ti: Sapphire laser, or may be a UV laser chosen to have a high absorption in LN. A computer driven translation stage (not shown) is preferably used to move the plate relative the to focal region of the laser radiation in both the x and y directions. As the pulse repetition rate of the type of mode-locked laser is typically in the range ~kHz to hundreds of kHz, this procedure can be accomplished in a relatively short time making this method suitable for a production environment. The number density of the modified sites D appearing at the focus F will then depend on the amount of time that the particular region spends near the focus. The insert in FIG. 5 shows schematically the relative acoustic intensity (Y) averaged across the z-direction, as a function of x. In operation this LN transducer plate is bonded onto the AO crystal using industry standard techniques with x corresponding to the direction of optical propagation (as per FIG. 2).

The laser radiation when focused into the small regions shown in FIG. 5, will either reduce the piezoelectric activity or induce ferroelectric domain inversion. Either effect will serve to carry out the necessary apodization. It is also possible to influence the ability of the transducer to radiate efficiently by implanting regions of damage or alteration which represent mechanical inhomogenieties, these will serve as centres of acoustic Rayleigh scattering and so weaken the locally emitted acoustic wave by scattering it.

The invention is expected to be broadly applicable and benefit a wide variety of AO comprising devices. Exemplary AO comprising devices include, but are not limited to, Acousto-Optic Modulators (AOMs), Acousto-Optic Beam Deflectors (AOBDs), Bragg Cells (BCs), Acousto-Optic Tunable Filters (AOTFs), Acousto-Optic Frequency Shifters (AOFSs) and Acousto-Optic Correlators (AOCs).

AO devices according to the invention are expected to benefit a variety of applications. One such application is hyperspectral imaging. Hyperspectral imaging is the term which has come to mean the collection of images in digital ("pixellated") form as in conventional image acquisition, but with an additional feature compared to normal imaging with regard to the spectral information content of each pixel. Conventional images either contain grey-scale information only, or in the case of color images, limited amounts of color information held in 3 channels (e.g. "red", "green", "blue") for the purpose of reproducing realistic-looking images. By contrast, hyperspectral imaging systems measure and store much more detailed spectral information for each pixel in the image, this extra information generally being represented by a "spectral" axis orthogonal to the two conventional transverse spatial axes of the image, giving rise to what is termed a "data"cube". Typically a hyperspectral imaging system may be capable of imaging in tens or hundreds of distinguishable spectral passbands. Such a complete description of the spectral content of each pixel within an image provides input for highly sophisticated pattern recognition and image processing software designed to "mine" the data cube for information on chemical composition, presence of pollutant or noxious compounds, camouflaged objects, etc. Hyperspectral sensors scan many channels across a relatively narrow bandwidth and provide detailed information about target spatial and spectral patterns. Absorption and emission bands of given substances often occur within very narrow bandwidths.

Hyperspectral sensors allow high-resolution, hyperspectral sensors to distinguish the properties of the substances to a finer degree than an ordinary broadband sensor. The intensity of this energy can be measured at various wavelengths. Many objects and substances have spectral characteristics that are unique and a unique spectral "signature" allows that object or substance to be identified through various spectral analyses. By using sensors to detect multiple wavelengths, it is possible to differentiate between natural and manmade objects, even different kinds of vegetation and various types of building materials.

Figure 6:
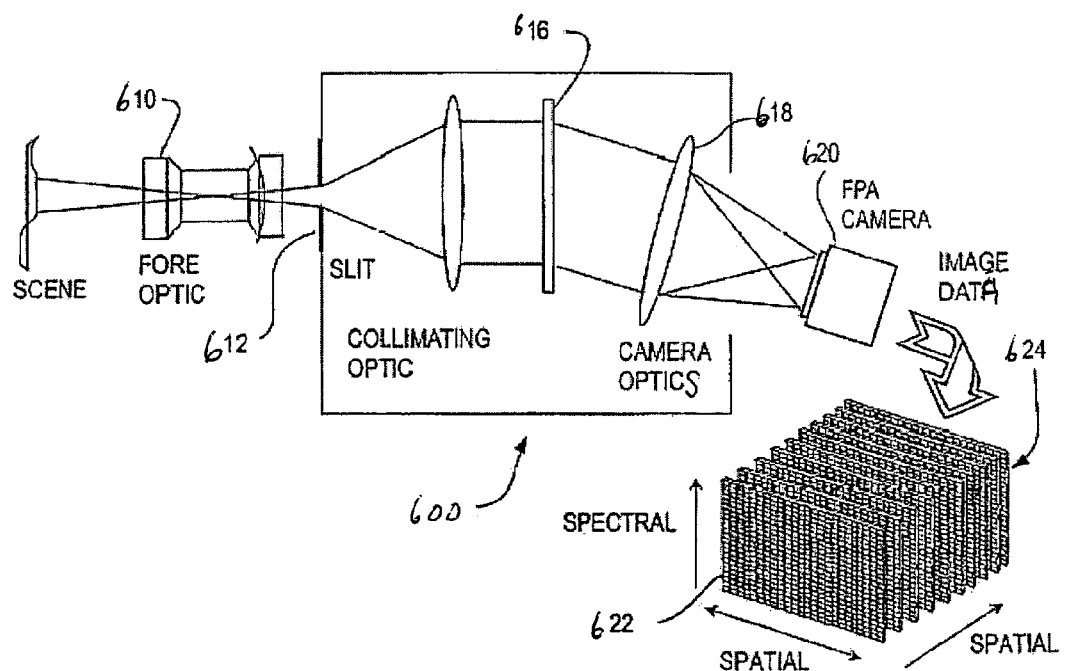
FIG. 6 shows a hyperspectral imaging spectrometer system that includes an AOTF according to the invention.

FIG. 6 shows a hyperspectral imaging spectrometer system 600 that comprises an AOTF according to an embodiment of the invention. Target imagery is projected through a fore-optic 610 into the aperture slit 612 of spectrometer system 600. The spectrometer system 600 includes AOTF 616 which diffracts the image into its spectral elements. The diffracted image is imaged by camera optics 618 onto a focal plane array (FPA) camera/detector 620. The diffracted image is in a narrow wavelength band ("color") determined by the RF frequency applied to the AOTF. By supplying a sequence of different frequencies to the AOTF, a series of images is built up, each one in a different wavelength band or color. When the series of images are combined, the result is an image cube 624, covering the terrain of interest in two orthogonal directions in a multitude of spectra.

Figure 10:
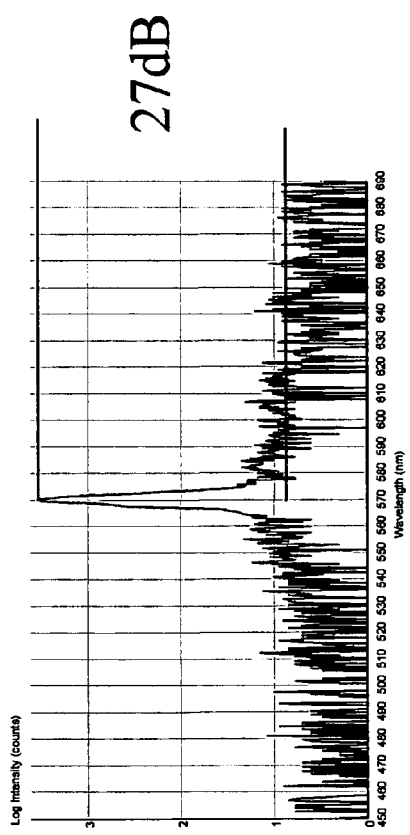
FIGS. 10(a), 11(a) and 12(a) show experimental results (at three (3) different operating optical wavelengths) obtained from a fabricated acousto-optic (AO) device according to the invention including finely patterned electrode layer, while FIGS. 10(b), 11(b) and 12(b) compare the results shown in FIGS. 10(a), 11(a) and 12(a) to a known AO device having eleven (11) separate transducer electrodes. Comparative results are displayed using solid curves for the inventive AO device while results from the known AO device are shown using dashed lines. Significantly lower side lobe levels are seen provided by the AO device according to the invention at each wavelength tested.
Figure 10:
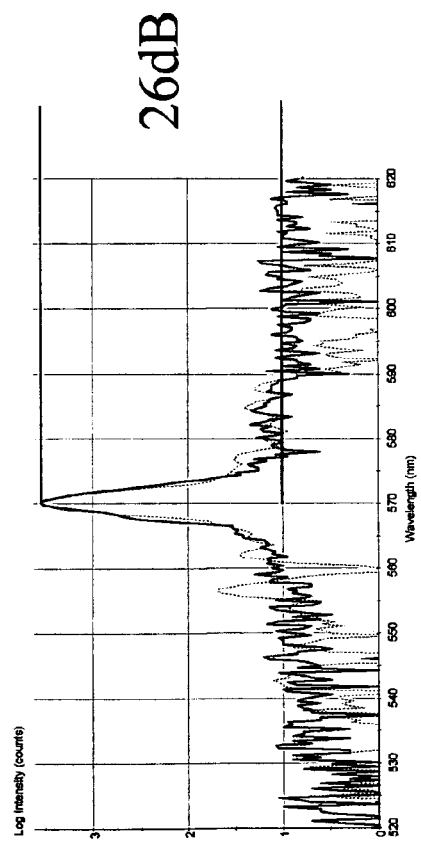
Figure 11:
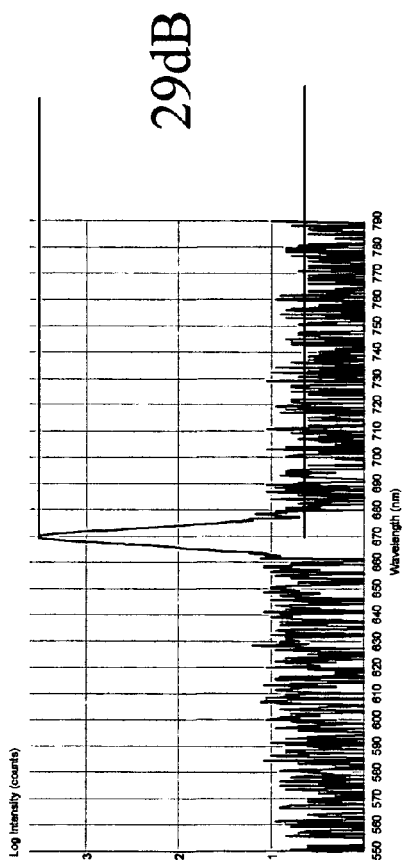
Figure 11:
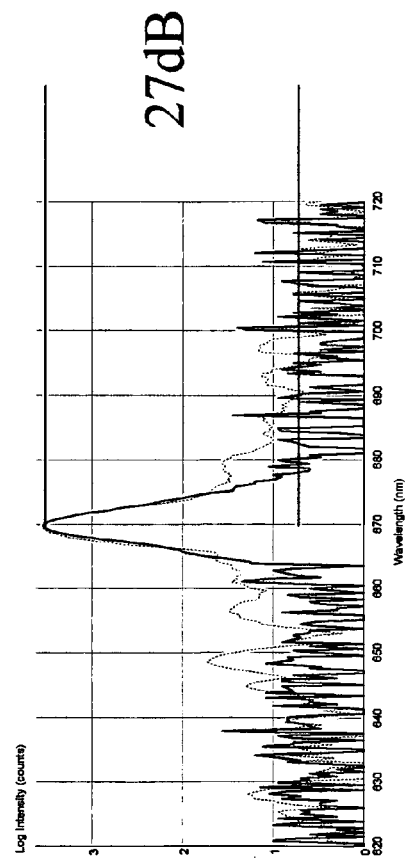
Figure 12:
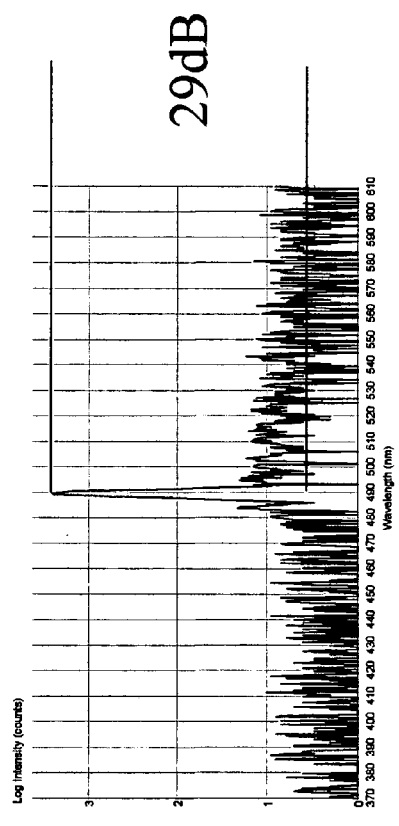
Figure 12:
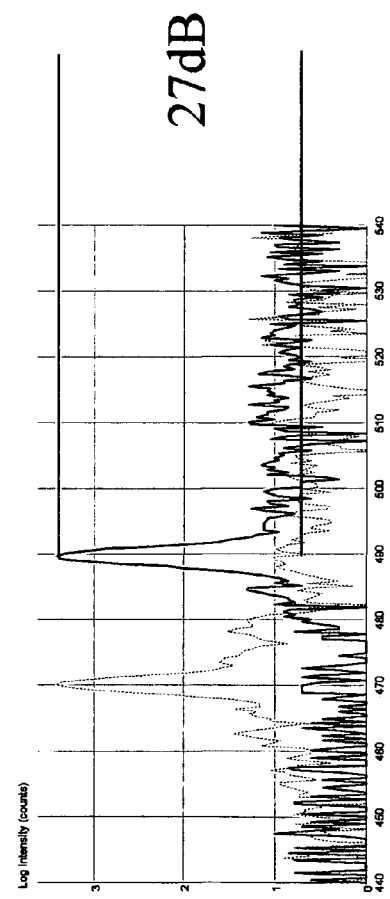

The spectral resolution of system 600 is primarily dependent on the optical parameters of AOTF 616. However, spatial resolution of the image is generally limited by both the pixel count of the camera/detector 620 and the AOTF 616 parameters. With modern array detectors, the limiting factor is usually the AOTF 616. It is a known peculiarity of the AOTF that the spatial resolution, as well as the spectral resolution is determined by the spectral sidelobe rejection within the AOTF. The quality of AOTF generally relates to the magnitude of the sidelobes transmitted along with the beam of interest. The invention importantly provides low sidelobe levels of generally between −20 and −30 dB relative to the main peak across an operating band as demonstrated in the Examples below. In FIGS. 10-12, the average for all measurements was a sidelobe level of −27.5 dB relative to the main peak for optical wavelengths spanning most of the visible light range.

The invention can thus be used to provide improved hyperspectral imaging systems which can substantially aid in homeland defense by countering terrorism, particularly with regard to improving military readiness through higher resolution imaging. Improved images which portray the various types of terrain and objects upon it in different colors forming the image cube allow enhanced translation into maps that correspond to certain types of material or objects to detect or identify military targets, such as tanks or mobile missile launchers. Enhanced algorithms can also better categorize types of terrain and vegetation (useful, for example, in counter-terrorism operations), detecting features such as disturbed soil, stressed vegetation, and whether the ground will support the movement of military vehicles. The invention can lead to this technology improving to the point that theater commanders can use mobile ground stations to process in real-time information transmitted by the satellite, critical to theater commanders for them to keep pace with rapidly changing conditions.

The invention can also be used for improved hyperspectral imaging systems for pollution monitoring. For example, the invention can be used for more sensitive following of plumes of gases, such as methane, as they move from the site of leaks.

EXAMPLES

It should be understood that the Examples described below are provided for illustrative purposes only and do not in any way define or in any way limit the scope of the invention.

Figure 7A:
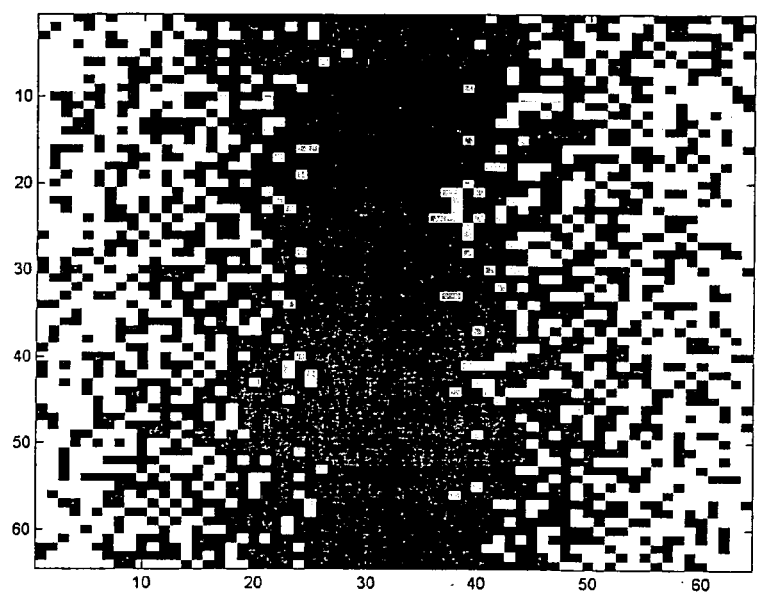
FIG. 7(a) shows a Gaussian weighting scheme for a transducer electrode based on 1-bit digitization of a Gaussian grey scale image, using error diffusion along a space filling fractal curve for an electrode pattern, according to an embodiment of the invention.
Figure 7B:
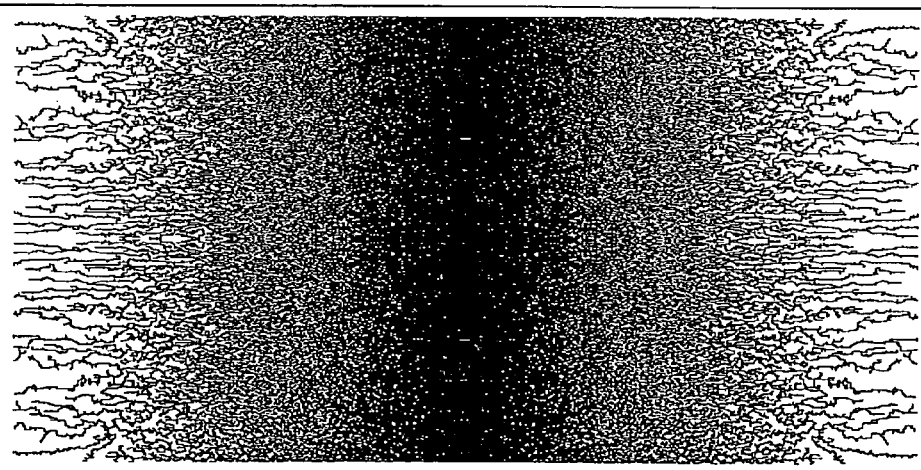
FIG. 7(b) shows a transducer electrode pattern derived from a higher order Hilbert curve, according to an embodiment of the invention.

FIG. 7(*a*) shows a patterned electrode for a transducer derived from a Gaussian weighting scheme based on 1-bit digitization of a Gaussian grey scale image, using error diffusion along a space filling fractal curve, the Hilbert curve, according to an embodiment of the invention. The region occupied by the meandering space filling curve shown is a square of 64×64 pixels. In the AO crystal below the top electrode and its associated transducer (not shown), light moves from left to right. The black squares (pixels) representing the regions of top electrode metallization are not contiguous. The central columns are almost completely uninterrupted metal, with only a few isolated gaps or "holes", moving outwards from the centre along a horizontal line (row) the metalled areas get progressively more sparse as one gets to the edges, making the probability of isolated metal "islands" rise as one moves towards the vertical edges.

As light moves from left to right it encounters regions of progressively higher acoustic intensity, as represented by the black (electroded) regions, with the centre being the highest intensity. The average variation in this direction is Gaussian, truncated at the level where the tails fall to 10% of the peak value. The inventors have found that this form of apodization function is generally satisfactory for most applications. In the orthogonal direction (the columns) the active transducer portion defined by the electrode pattern is uniform on average, such that there is no apodization in this direction. The electrode pattern shown in FIG. 7(*a*) is for illustrative purposes being only 64×64 pixels, and also being generally of no utility due to the difficulty in biasing the many non-contiguous electrode portions. This "raw" pattern is the result of digitizing a Gaussian grey-scale image in which each pixel contains a number between 0 and 1 representing the height of the Gaussian surface. The digitisation is 1-bit digitisation and is carried out with error diffusion around a 5th order Hilbert curve, as described in Peitgen (and references therein). The basic method is to start in one corner, advancing around the meandering Hilbert curve. At each pixel the following question is posed: "Is the numerical value of this pixel greater or less than 0.5?". If "greater", then a "1" (metal, represented by black squares) is put in that pixel, and the error is passed along the Hilbert curve to the next pixel. If "less" then a "0" is put in that pixel and the error transferred on to the next pixel. At each pixel it is the (value of the current pixel+error from last pixel digitisation) which is digitised. This results in a pattern of black and white pixels such as shown in FIG. 7(*a*).

The next step is to perturb or "shuffle" the columns of 7(*a*) in such a way that the total number of black squares in each column is unchanged (so as not to upset the Gaussian weighting) but they are moved about in a vertical direction so as to ensure that no diagonal connections between black squares or isolated black islands are left. The method actually employed by the Inventors starts this process in the centre, where there is a nearly unbroken area of black, advancing to the left and right, column by column. At the start, there is very little to do as most of the black squares in a column are joined up anyway. The situation changes further from the center, because there are more isolated patches and even individual squares. The intermediate result of this procedure is not shown, but this procedure was repeated on a 256×256 array, to get the result shown in FIG. 7(*b*) which was the pattern actually used to generate the AO device for which results therefrom are shown in FIGS. 10-12. In FIG. 7(*b*) an additional step of "stretching" the pattern was performed in the horizontal direction by a factor of 2, because that gave the aspect ratio desired for the test device, a 2:1 length:width ratio. The precise value of this ratio in no way affects the method shown here, which is general.

The pattern was stretched using the following simple algorithm: For every pixel (square) in any row or column, another immediately adjacent square of the same type (black added to black, white added to white) was added in the same row to the right of it if we were on the right hand side of the vertical symmetry line, or on the left if on the left hand side.

A prototype apodized AO device according to the invention was fabricated, and tested. The AO device utilized the Hilbert curve defined transducer top electrode pattern shown in FIG. 7(*b*). In this pattern, the fundamental feature size (characteristic size of the fine structure; the finger widths) was about 10 μm.

The Hilbert curve defined electrode pattern apodized the acoustic field emitted by a LN transducer and reduced the sidelobes from −9.5 dB to −30 dB compared to a uniform (non-apodized) transducer top electrode in an acousto-optic tuneable filter. Test conditions comprised an aperture of 12 mm square, placed between a pair of relay lenses of focal length 100 mm such that the light incident on the AOTF was substantially collimated. In this case, the order of the grid was increased from 64 to 256 and the columns were slightly re-arranged (keeping the number of black squares in any column constant) after the generation of the initial pattern in order that the whole electrode was contiguous, that it is all connected up electrically with no isolated islands of metal.

Figure 8A:
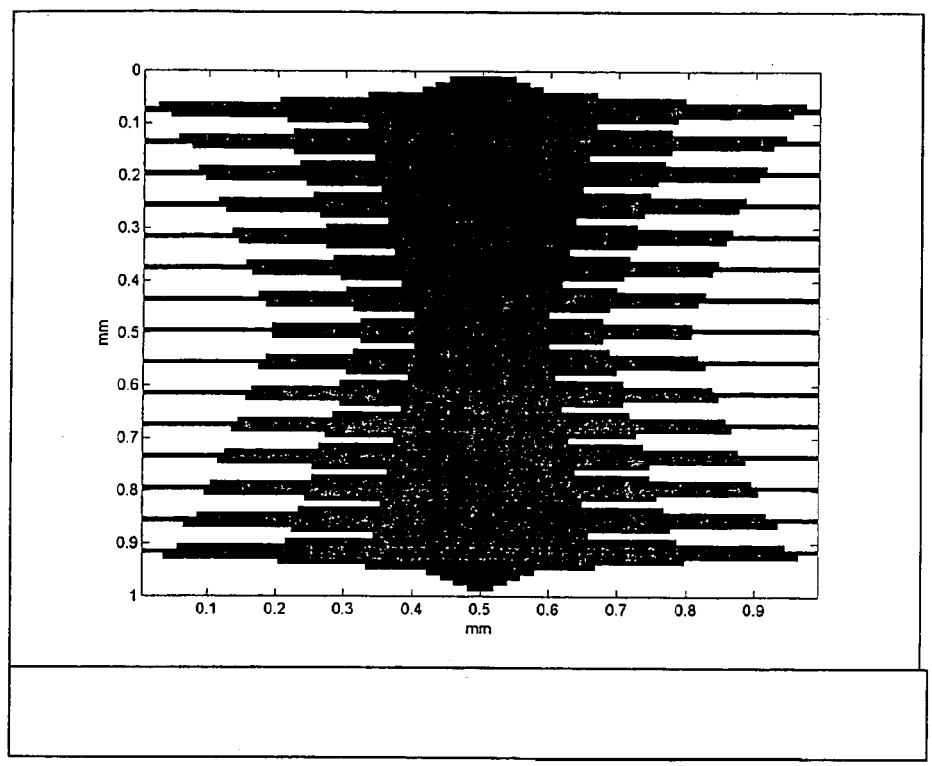
FIGS. 8(a) and (b) shows transducer electrode arrangements in which apodization is achieved by the introduction of metal top electrode patterns whose structure varies on a scale which is smaller than, or comparable to, an the acoustic wavelength. From the centre of the pattern there are progressively thinner and thinner "fingers" of metal, in order to approximate the Gaussian distribution when averaged over the columns.
Figure 8B:
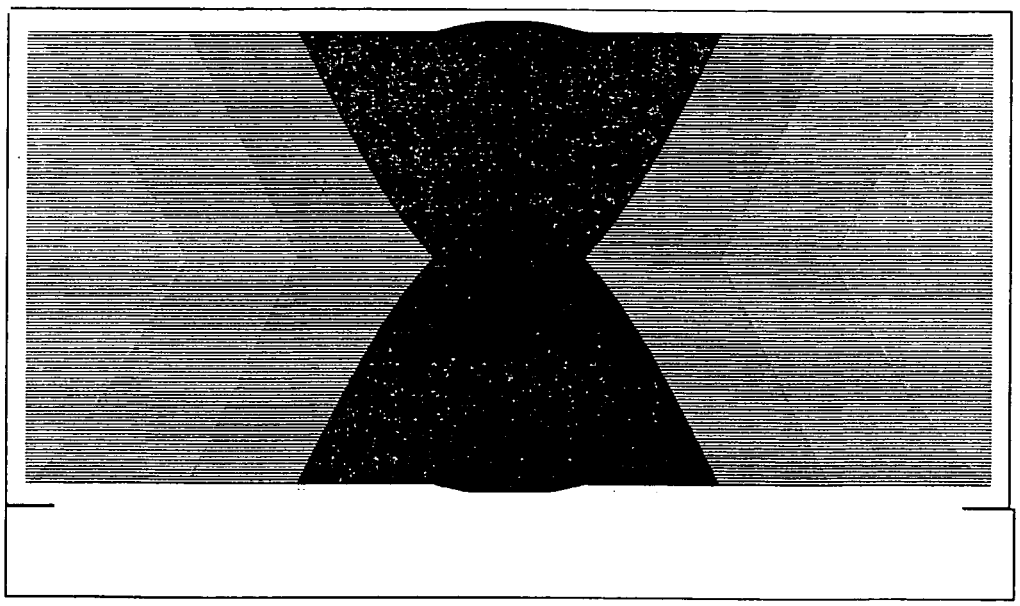

FIGS. 8(*a*) and (*b*) show electrode arrangements in which apodization is achieved by the introduction of metal patterns whose structure (finger width and finger spacing) varies on a scale which is smaller than, or comparable to, an acoustic wavelength, such as 10 μm. Such a pattern can be implemented using conventional photolithography, which can also be used to implement irregular features, such as curved or angled features. In the case shown, a more deterministic pattern was chosen where moving outwards from the centre using progressively thinner and thinner "fingers" of metal approximates the Gaussian distribution when averaged over the columns. The central region is virtually uninterrupted metal, with the horizontal fingers becoming wide enough to merge together, while at the extreme left and right hand sides the fingers are at their narrowest in order to approximate to the tails of the Gaussian. The predominantly horizontal structure ensures that all the metal is contiguous from the start, and the extra step of joining up isolated metal islands is therefore not necessary. FIG. 8(a) shows a relatively coarse structure for the purposes of illustration, while FIG. 8(b) shows a much finer structure based on about 10 micron feature sizes, this latter is illustrative of a pattern that could be used in a practical device.

Figure 9A:
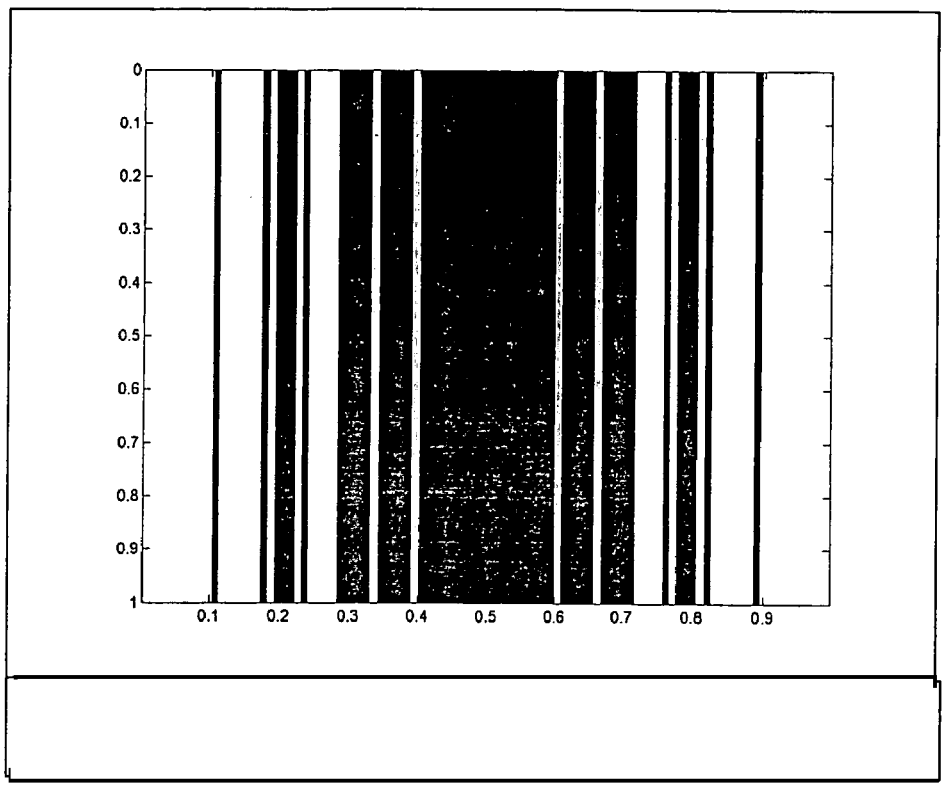
FIG. 9(a) shows another transducer electrode configuration for apodization, where the number density of vertical fingers is adjusted in order to approximate a Gaussian apodization.
Figure 9B:
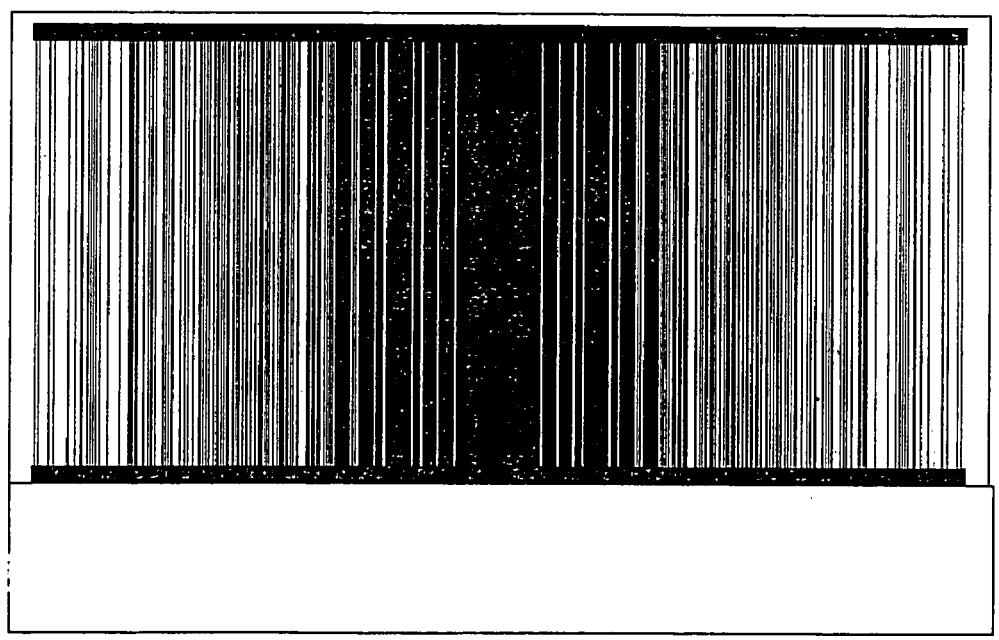
FIG. 9(b) shows another electrode pattern including fine structure where the elementary width of the fingers shown are on the order of 5 to 10 microns. Near the pattern symmetry axis, the number density is high enough for the fingers to overlap and generate a continuous region. "Bus bars" are introduced at the top and bottom extremes of the rectangular area in order for the fingers to be electrically connected together.

FIGS. 9(a) and 9(b) shows alternate electrode configuration for an apodized transducers. FIG. 9(a) is for illustrative purposes, while FIG. 9(b) is representative of a spatially fine pattern that could be used for a practical device. The number density of vertical fingers was adjusted in order to approximate a Gaussian apodization. The fine structuring condition according to the present invention is not present, which means that although the apodized transducer shown in FIG. 9(a) would function satisfactorily for a sonar transducer, it would not be suitable for most modern AO applications, such as for imaging.

FIG. 9(b) shows an electrode pattern including fine structure. The elementary width of the fingers shown are on the order of 5 to 10 microns. Near the pattern symmetry axis, the number density is high enough for the fingers to overlap and generate a continuous region. In this invention "bus bars" are introduced at the top and bottom extremes of the rectangular area in order for the fingers to be connected and form a contiguous electrode to facilitate biasing. Two bus bars are shown, but only one is generally necessary.

EXPERIMENTAL RESULTS

FIGS. 10(a), 1(a) and 12(a) show experimental results (at three (3) different operating optical wavelengths) obtained from a fabricated acousto-optic (AO) device according to the invention including finely patterned electrode layer, while FIGS. 10(b), 11(b) and 12(b) compare the results shown in FIGS. 10(a), 11(a) and 12(a) to a known AO device having eleven (11) separate transducer electrodes. Comparative results are displayed using solid curves for the inventive device while results from the known AO device are shown using dashed lines. Significantly lower side lobe levels are seen provided by the AO device according to the invention at each wavelength tested. In addition to improved performance provided by devices according to the invention, as noted above, the cost and complexity of devices according to the invention is significantly reduced as compared to the known multi-electrode AO device. For example, the known AO device requires adjustment procedure needed to get all the transducer sub-elements operating substantially in phase over the whole tuning range, and operation requires a complicated and expensive bank of separate RF drivers The AOTF device according to the invention utilized the Hilbert curve defined (Gaussian) transducer top electrode pattern shown in FIG. 7(b). As noted above, in this pattern, the fundamental feature size (characteristic size of the fine structure; the finger widths and finger spacing) was about 5 to 10 μm.

Regarding the known AOTF device, the rectangular top electrode was divided up into 11 electrically independent sub-electrodes. Each electrode was driven using a separate RF driver. In the arrangement used, each electrode segment was provided its own matching circuit and flexible cable connection to a multichannel RF driver, the latter containing all the RF drive electronics including the RF amplifiers. All the cables were closely matched in length to within a few mm and were adjusted to get all the transducer sub-elements operating substantially in phase over the whole tuning range.

Figure 1:
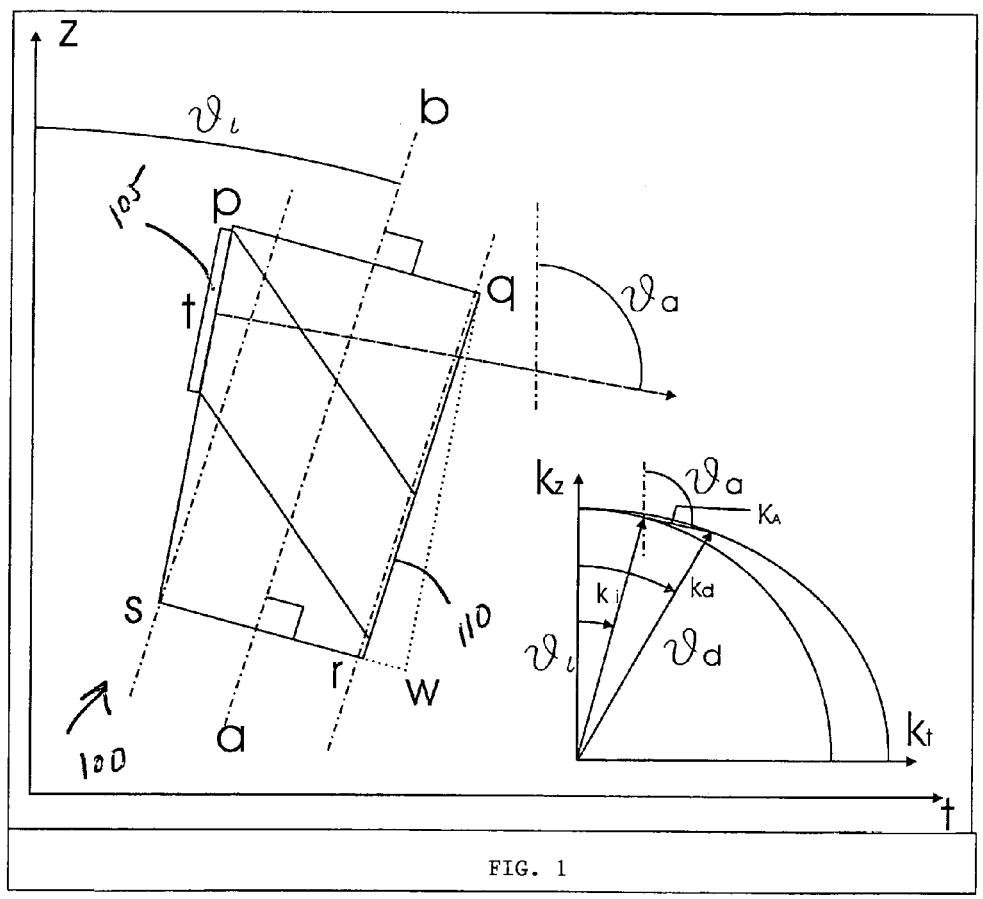
FIG. 1 shows a schematic of a conventional non-collinear AOTF showing a piezoelectric transducer bound to an AO interaction crystal. The accompanying associated k-vector diagram explains the operation of the filter.

The AOTF devices each had an aperture of 12 mm square optical aperture, o-ray incident, and was designed to have $\theta_i = 15.5$ degrees as per FIG. 1. The acoustic angle, $\theta a$ (again defined in FIG. 1 was 96.58 degrees. In each case the diffraction efficiency was adjusted to be a maximum, and in all cases this was approximately 88%. The temperature was room ambient, approx 23 degrees C. The AOTF devices were placed between a pair of relay lenses of focal length 100 mm such that the light incident on the AOTF was substantially collimated. The acoustic wavelength used was in the range from 5 to 10 microns. Measurements were performed at 3 wavelengths which were representative of the intended wavelength band (the visible) generally used by AOTFs, comprising 470/490 nm, 570 nm, 670 nm. For the test device, the acoustic wavelengths produced were approximately 5.5 microns for the 470/490 nm band 6.9 microns for the 570 nm band and 8.6 microns for the 670 nm band. If the experimental setup had allowed tuning to 800 nm, the acoustic wavelength would have been about 10.3 microns.

Referring now to FIG. 10(a), experimental results for the inventive AOTF device is shown at maximum efficiency at 490 nm. The intensity scale on the y-axis is a logarithmic scale, so that each increment represents 20 db. Sidelobe levels are barely discernable over the noise level and appear to be about –27 dB from the peak shown. FIG. 10(b) shows the data from FIG. 10(a) (solid line) overlaid with data at 470 nm obtained using the known AOTF device having 11 separate transducer electrodes (dashed line). Sidelobe levels for the known AOTF device are seen to be readily identifiable above the noise level.

FIG. 11(a) shows experimental results for the inventive AOTF device at maximum efficiency at 570 nm. Sidelobe levels are again barely discernable and appear to be about –27 dB from the peak shown. FIG. 11(b) shows the data from FIG. 11(a) (solid line) overlaid with data at 570 nm obtained using the known AOTF device having 11 separate transducer electrodes (dashed line). Sidelobe levels for the known AO device are again seen to be readily identifiable above the noise level.

FIG. 12(a) shows experimental results for the inventive AOTF device at maximum efficiency at 670 nm. Sidelobe levels are again barely discernable and appear to be about –27 dB from the peak shown. FIG. 12(b) shows the data from FIG. 11(a) (solid line) overlaid with data at 670 nm obtained using the known AO device having 11 separate transducer electrodes (dashed line). Sidelobe levels for the known AO device are again seen to be readily identifiable above the noise level.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

We claim:

1. An acousto-optic (AO) device for generating a highly apodized acoustic wave field, comprising:
   a piezoelectric transducer crystal for emitting an acoustic wave having a ground electrode disposed on one side of said piezoelectric crystal;
   a patterned electrode layer disposed on a side of said piezoelectric crystal opposite said ground electrode, said patterned electrode layer including a continuous region proximate to its centre and a discontinuous region, a pattern in said discontinuous region comprising a plurality of spaced apart features electrically connected to said continuous region, and
   an AO interaction crystal receiving said acoustic wave attached to said ground electrode or said patterned electrode layer, wherein feature sizes of said features in said pattern are sufficiently small to provide a fine structure far field condition for said acoustic wave in said AO interaction crystal underlying said discontinuous region beginning <5 mm measured from an interface between said piezoelectric crystal and said AO interaction crystal.

2. The AO device of claim 1, wherein said feature sizes in said pattern are predominately less than 20 μm.

3. The AO device of claim 1, wherein said feature sizes in said pattern are predominately less than 10 μm.

4. The AO device of claim 1, wherein said pattern provides a reduction in the amount of metal when moving outward from said continuous centre in both directions.

5. The AO device of claim 1, wherein said patterned electrode layer includes fractal patterns.

6. The AO device of claim 5, wherein said fractal pattern is based on space filling a 2-dimensional fractal curve.

7. The AO device of claim 1, wherein said pattern comprises Gaussian weighting having said features oriented parallel to one another and orthogonal to a length of said central region.

8. The AO device of claim 1, wherein said pattern comprises a spaced apart electrode grid disposed parallel to a length of said continuous region, said grid electrically coupled together using at least one bus bar.

9. The AO device of claim 1, wherein said fine structure far field condition begins <2.5 mm from said interface.

10. The AO device of claim 1, wherein said fine structure far field condition begins <1.0 mm from said interface.

11. The AO device of claim 1, wherein said AO interaction crystal is attached to said patterned electrode.

12. The AO device of claim 1, wherein said transducer crystal includes a plurality of sub-surface locations having altered sites, said altered sites being fine patterned and reducing a piezoelectric effect therein.

13. The AO device of claim 1, wherein said AO device comprises an Acousto-Optic Modulator (AOM), Acousto-Optic Beam Deflector (AOBD), Bragg Cell (BC), Acousto-Optic Tunable Filter (AOTF), Acousto-Optic Frequency Shifter (AOFS) or an Acousto-Optic Correlator (AOC).

14. A hyperspectral imaging spectrometer system, comprising:
   said AO device recited in claim 1 for separating an image of a scene into a separated image comprising its spectral elements, and
   camera optics and a focal plane array (FPA), said camera optics for imaging said separated image onto said FPA.

15. A method of forming an acousto-optic (AO) device for generating a highly apodized acoustic wave field, comprising the steps of:
   providing a piezoelectric transducer crystal;
   laser irradiating a plurality of locations in said transducer crystal to induce mechanical sub-surface altered sites leading to a reduction or loss of the piezoelectric effect in said altered sites, and
   bonding said piezoelectric transducer crystal to an AO interaction crystal;
   wherein a geometry and number density of said altered sites provides a fine structure far field condition for an acoustic wave in said AO interaction crystal underlying said altered sites beginning <5 mm measured from an interface between said piezoelectric crystal and said AO interaction crystal.

16. The method of claim 15, wherein said laser irradiating comprises pulsed laser irradiating.

17. The method of claim 15, wherein said altered sites provide feature sizes predominately less than 20 μm.

18. The method of claim 15, wherein said altered sites provide feature sizes predominately less than 10 μm.

19. The method of claim 15, wherein a density of said altered sites provides a reduction when moving outward from a centre of said transducer crystal in both directions.

20. The method of claim 15, wherein altered sites are in fractal patterns.

21. The method of claim 15, wherein said altered sites result in either a suppression of the local piezoelectric activity of the transducer crystal or an inversion of local crystal axes of said transducer crystal leading to a sign reversal of its piezoelectric tensor components.

* * * * *